United States Patent
Amuru et al.

(10) Patent No.: US 11,018,811 B2
(45) Date of Patent: May 25, 2021

(54) METHOD AND USER EQUIPMENT (UE) FOR MANAGING HARQ PROCEDURE FOR MULTIPLE NUMEROLOGIES

(71) Applicant: Samsung Electronics Co., Ltd., Suwon-si (KR)

(72) Inventors: Saidhiraj Amuru, Bangalore (IN); Hyun-Seok Ryu, Yongin-si (KR); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/483,964

(22) PCT Filed: Feb. 6, 2018

(86) PCT No.: PCT/KR2018/001612
§ 371 (c)(1),
(2) Date: Aug. 6, 2019

(87) PCT Pub. No.: WO2018/143785
PCT Pub. Date: Aug. 9, 2018

(65) Prior Publication Data
US 2020/0099475 A1 Mar. 26, 2020

(30) Foreign Application Priority Data

Feb. 6, 2017 (IN) .............................. 201741004273
Feb. 5, 2018 (IN) .............................. 201741004273

(51) Int. Cl.
*H04L 1/18* (2006.01)
*H04W 72/04* (2009.01)
*H04W 76/27* (2018.01)

(52) U.S. Cl.
CPC .......... *H04L 1/1812* (2013.01); *H04L 1/1854* (2013.01); *H04L 1/1887* (2013.01);
(Continued)

(58) Field of Classification Search
CPC ... H04L 1/1812; H04L 1/1854; H04L 1/1887; H04L 1/1825; H04L 1/1864; H04W 72/042; H04W 76/27; H04W 72/044
See application file for complete search history.

(56) References Cited

U.S. PATENT DOCUMENTS 9,485,060 B2* 11/2016 Nayeb Nazar ........ H04L 1/0073
2016/0173262 A1* 6/2016 Davydov .............. H04L 1/0075
370/329
2016/0205690 A1 7/2016 Berggren et al.

FOREIGN PATENT DOCUMENTS

EP 3554159 A1 10/2019
WO 2010/019522 A1 2/2010
WO 2011041623 A1 4/2011

OTHER PUBLICATIONS

ISA/KR, International Search Report and Written Opinion of the International Searching Authority, International Application No. PCT/KR2018/001612, dated May 31, 2018, 10 pages.

(Continued)

*Primary Examiner* — Dady Chery

(57) ABSTRACT

Embodiments herein provide a method for managing HARQ procedure for multiple numerologies multiplexing in a wireless communication network. The method includes transmitting, by a User Equipment (UE), capability parameters of the UE to a Base Station (BS). Further, the method includes receiving, by the UE, a plurality of HARQ configuration parameters corresponding to the capability parameters of the UE from the BS, and perfuming, by the UE, one of an individual HARQ process and a shared HARQ process based on the plurality of HARQ configuration parameters received from the BS.

20 Claims, 6 Drawing Sheets

(52) U.S. Cl.
CPC ........ *H04W 72/042* (2013.01); *H04W 72/044* (2013.01); *H04W 76/27* (2018.02)

(56) References Cited

OTHER PUBLICATIONS

Huawei, et al., "Signalling design for UL control resource in NR," R1-1611213, 3GPP TSG RAN WG1 Meeting #87, Reno, USA, Nov. 14-18, 2016, 4 pages.
Huawei, et al, "UL control channels for CA and DC," R1-1611653, 3GPP TSG RAN WG1 Meeting #87, Reno, USA, Nov. 14-18, 2016, 3 pages.
Interdigital Communications, "MAC Layer Impact of Supporting Different Numerologies," R1-1612357, 3GPP TSG-RAN WG1 #87, Reno, Nevada, Nov. 14-18, 2016, 4 pages.
Samsung, "Carrier Aggregation Aspects," R1-1612437, 3GPP TSG RAN WG1 #87, Reno, USA, Nov. 14-18, 2016, 3 pages.
Supplementary Partial European Search Report dated Jan. 14, 2020 in connection with European Patent Application No. 18 74 8761, 14 pages.
Intel Corporation, "MAC entities to support multiple NR verticals", 3GPP TSG-RAN2 Meeting #96, Nov. 14-18, 2016, R2-168531, 5 pages.
Supplementary European Search Report in connection with European Application No. 18748761.6 dated Jun. 23, 2020, 13 pages.
Office Action dated Aug. 21, 2020 in connection with India Patent Application No. 201741004273, 6 pages.

\* cited by examiner

FIG. 1A

15 KHZ SCS

| SF | n | n +1 | n +2 | n +3 | n +4 | n +5 | n +6 | n +7 | n +8 |
|---|---|---|---|---|---|---|---|---|---|
| Action | Tx (DL) | -- | -- | -- | A/N (UL) | -- | -- | -- | ReTx (DL) |

Fig. 1B

30 KHZ SCS

| SF | n1 | n2 | n3 | n4 | n5 | n6 | n7 = n3 +4 | n8 | n9 | n 10 = n6 + 4 | n 11 | n 12 | n 13 | n 14 | n 15 | n 16 | n 17 | n 18 |
|---|---|---|---|---|---|---|---|---|---|---|---|---|---|---|---|---|---|---|
| Action | -- | -- | Tx (DL) | Tx (DL) | | | | | A/N (UL) | A/N (UL) | | | | | | | -- | -- |

Actual location of A/N for n3

In case of HARQ sharing A/N cannot be sent here

Joint A/N for n3 and n4

Potential re-transmissions instances for n3 and n4

Fig. 2A

15 KHZ SCS

| D | S | U | U | U | D | S | U | U | U | D | S | U | U | U | D | S | U | U |
|---|---|---|---|---|---|---|---|---|---|---|---|---|---|---|---|---|---|---|
| Tx 1 | Tx 2 | | | A/N1 | Tx 3 | A/N2 | | | A/N3 | Re/Tx 1 | Re/Tx 2 | | | | Re/Tx 3 | | | |

Fig. 2B

30 KHZ SCS

| D | S | U | U | U | D | S | U | U | U | D | S | U | U | U | D |
|---|---|---|---|---|---|---|---|---|---|---|---|---|---|---|---|
| Tx 1 | Tx 2 | | | A/N1 | Tx 3 | A/N2 | | | A/N3 | Re/Tx 1 | Re/Tx 2 | | | | Re/Tx 3 |

| D | S | U | U | D | S | U | U | U | D | S | U | U | U | D | S | U | U | U | D | S | U | U | U | D | S | U | U | U | D | S |
|---|---|---|---|---|---|---|---|---|---|---|---|---|---|---|---|---|---|---|---|---|---|---|---|---|---|---|---|---|---|---|
| | | | | | | TX1 | TX2 | | | | A/N1 | | | | A/N2 | | | | ReTX1 | ReTX2 | | | | TX3 | TX4 | | A/N3 | | A/N3 | | ReTx2 | |

METHOD AND USER EQUIPMENT (UE) FOR MANAGING HARQ PROCEDURE FOR MULTIPLE NUMEROLOGIES

CROSS-REFERENCE TO RELATED APPLICATIONS

This application is a National Phase Entry of PCT International Application No. PCT/KR2018/001612, which was filed on Feb. 6, 2018, and claims priority to Indian Provisional Patent Application No. 201741004273 filed on Feb. 6, 2017 and Indian Complete Patent Application No. 201741004273 filed on Feb. 5, 2018 in the Indian Intellectual Property Office, the contents of which are incorporated herein by reference.

BACKGROUND

1. Field

The embodiments herein generally relate to wireless communication network. More particularly, related to a method and User Equipment (UE) for managing Hybrid Automatic Repeat Request (HARQ) procedure for multiple numerologies multiplexing in the wireless communication network.

2. Description of the Related Art

The 5th generation (5G) telecommunication is expected to support wide range of services including enhanced mobile broadband, ultra reliable and low latency communication, massive machine type communications, etc. Each service has its own specific set of requirements, which is expected to be catered by the cellular network. For instance, enhanced mobile broadband requires high speed of data transfer, ultra reliable low latency communication requires data transfer with very low latency but may not require high data rate, while massive machine type communications may have the requirement to minimize User Equipment (UE) power consumption. In order to cater for different requirements, the cellular network can partition radio resources such that each set of radio resources can meet the requirements of a given service by using different physical layer configurations.

In 5G system, it would be possible for the UE to access multiple services concurrently, hence Radio Access Network (RAN) procedures are required to be designed such that different physical layer configurations can be operated efficiently by the UE without hampering any of the service requirements. It is expected that single Medium Access Control (MAC) entity could possible support multiple physical layer configurations or numerologies simultaneously. Of course this depends on the capability of the UE hardware. This introduces new challenges in terms of the physical layer operations such as HARQ procedures. For instance, in LTE and associated releases, only one numerology is used across all carriers used in the carrier aggregation mechanism. Further, Physical Uplink Control Channel (PUCCH) on the primary cell will carry the HARQ information for all the carriers. However, such a mechanism will not be useful for future wireless systems (i.e., 5G) when different numerologies may be considered for different carriers and even within a single carrier. The mechanisms are necessary to efficiently support HARQ procedures.

Thus, it is desired to address the above mentioned disadvantages or other shortcomings or at least provide a useful alternative.

SUMMARY

The principal object of the embodiments herein is to provide a method and UE for managing HARQ procedure for multiple numerologies multiplexing in a wireless communication network.

Another object of the embodiments herein is to provide a method for performing a shared (i.e., combined) HARQ procedure in case of multiple numerologies (e.g., comprising a plurality of different set of numerologies).

Another object of the embodiments herein is to provide a method for supporting joint uplink control information (UCI) feedback for aggregated carriers with different numerology.

Another object of the embodiments herein is to provide a method for supporting one PUCCH in one cell group for NR DC/CA, where each cell group comprises of an identical numerologies.

Another object of the embodiments herein is to provide HARQ configurations such as HARQ processes, HARQ timing indications for future wireless systems.

Another object of the embodiments herein is to provide HARQ priority based mechanism to account for the traffic types in future wireless systems.

Accordingly the embodiments herein provide a method for managing for managing HARQ procedure for multiple numerologies multiplexing in a wireless communication network. The method includes transmitting, by a User Equipment (UE), capability parameters of the UE to a Base Station (BS). Further, the method includes receiving, by the UE, a plurality of HARQ configuration parameters corresponding to the capability parameters of the UE from the BS, and perfuming, by the UE, one of an individual HARQ process and a shared HARQ process based on the plurality of HARQ configuration parameters received from the BS.

In an embodiment, the plurality of HARQ configuration parameters comprises at least one of a HARQ timing configurations, a joined HARQ-ACK codebook for performing the shared HARQ process, a group identifier representing a plurality of carriers corresponding to each identical numerology from multiple numerologies for performing the shared HARQ process, a service type and a plurality of service parameters.

In an embodiment, the service type and the plurality of service parameters are used for determining priority of the HARQ procedure to perform the shared HARQ process.

In an embodiment, the the capability parameters of UE comprises at least one UE minimum HARQ processing time, subcarrier spacing, TTI length, timing advance (TA), maximum TBS, and UE power constraint and HARQ buffer constraint.

In an embodiment, the HARQ timing configuration are received from the BS through one of a System Information Block (SIB) message, a Radio Resource Control (RRC) message and a DCI message.

Accordingly the embodiments herein provide a UE hybrid automatic repeat request (HARQ) procedure for multiple numerologies multiplexing. The UE comprising a memory, a processor coupled to the memory, and a HARQ procedure executor configured to transmit capability parameters of the UE to a Base Station (BS). Further, the HARQ procedure executor is configured to receive a plurality of HARQ configuration parameters corresponding to the capability parameters of the UE from the BS. Furthermore, the HARQ procedure executor is configured to perform one of an individual HARQ process and a shared HARQ process based on the plurality of HARQ configuration parameters received from the BS.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIGS. 1A-1B illustrates an example of TDM numerology multiplexing in LTE-FDD system;

FIGS. 2A-2B illustrates an example of TDM numerology multiplexing in LTE-TDD systems with DL-UL configuration 0;

DETAILED DESCRIPTION

Figure 3:
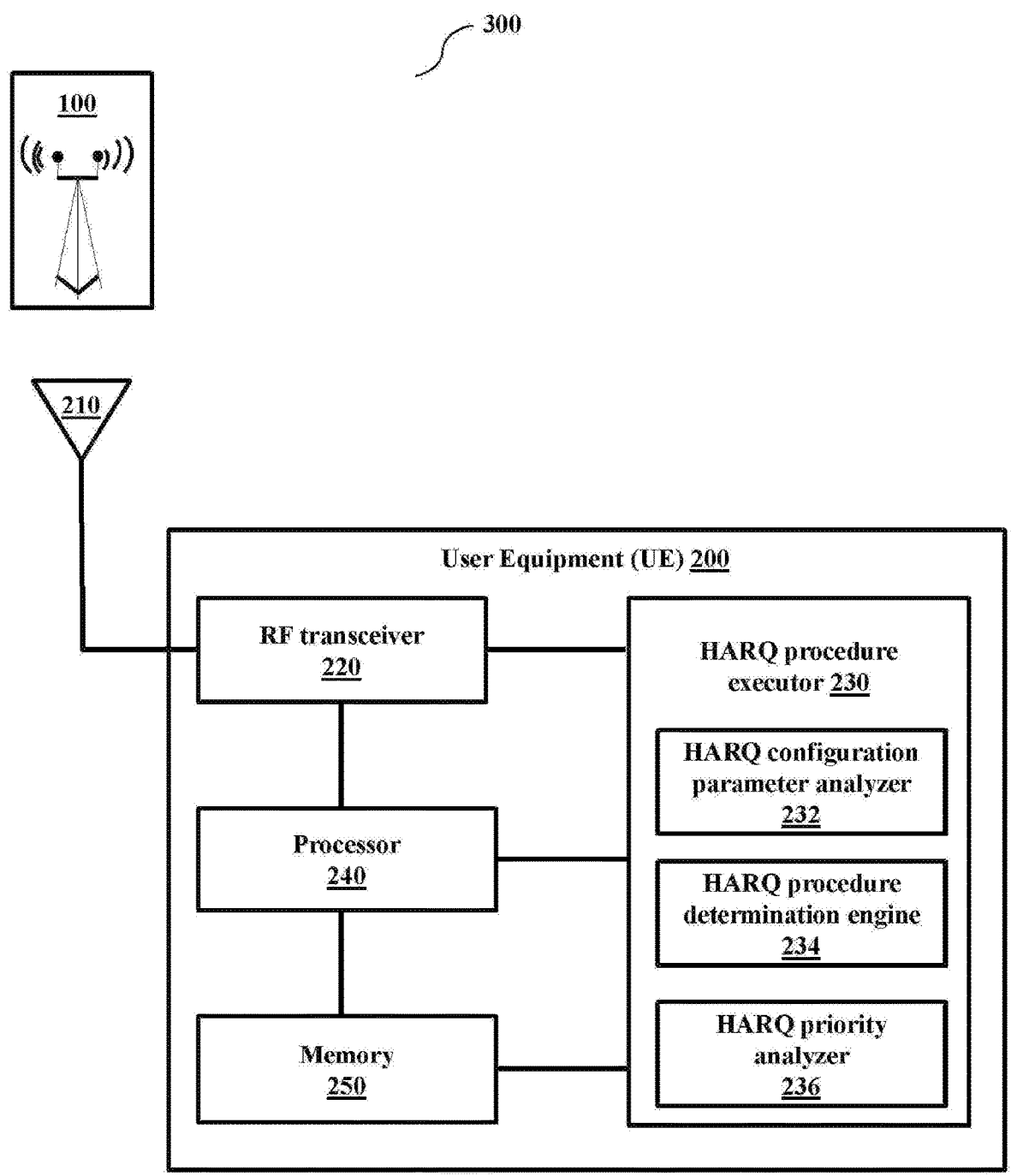
FIG. 3 illustrates a wireless communication system including a BS and a UE for managing HARQ procedure in case of multiple numerologies, according to embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Prior to describing the embodiments in detail, it is useful to provide definitions for key terms used herein. Unless defined otherwise, all technical terms used herein have the same meaning as commonly understood by a person having ordinary skill in the art to which this invention belongs.

Considering limited number of HARQ processes, it is necessary to handle them efficiently, following are the HARQ procedure for multiple numerologies multiplexing in future wireless communication systems.

Individual HARQ procedure: In response to receiving the HARQ configuration parameters (i.e., HARQ processes, HARQ timing indications) from the BS, the UE can perform the individual HARQ procedure with cells operating in different subcarrier. For example, if the UE upon determining that there is no latency in HARQ processes, determines that the HARQ transmission with the "A" cell operating at numerology-1 needs to transmitted at n+4 sub-frame and the HARQ transmission with the "B" cell operating at numerology-2 needs to transmitted at n+6 sub-frame, then individual HARQ procedure with each cell can be followed.

Shared HARQ procedure: In response to receiving the HARQ configuration parameters (i.e., HARQ processes, HARQ timing indications) from the BS, the UE can perform the shared HARQ procedure with cells operating in different subcarrier. For example, if the UE upon determining that there is latency in HARQ processes/in case of power savings, a joint HARQ codebook can be followed across carriers with multiple numerologies (cell "A" and cell "B") such that numerology aggregation is taken into account. Further, the shared HARQ process is similar to "slot aggregation due to difference in numerologies.

As traditional in the field, embodiments may be described and illustrated in terms of blocks which carry out a described function or functions. These blocks, which may be referred to herein as units, manager, detector, engine, or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for managing for managing HARQ procedure for multiple numerologies multiplexing in a wireless communication network. The method includes transmitting, by a User Equipment (UE), capability parameters of the UE to a Base Station (BS). Further, the method includes receiving, by the UE, a plurality of HARQ configuration parameters corresponding to the capability parameters of the UE from the BS, and determining, by the UE, to perform one of an individual HARQ process and a shared HARQ process based on the plurality of HARQ configuration parameters received from the BS.

Unlike to conventional methods and conventional systems, the proposed method can be used to provide HARQ procedure for Multiple Numerologies Multiplexing in Future Wireless Systems. The proposed method provides HARQ configurations such as HARQ processes, HARQ timing indications for future wireless systems. Further, the proposed method provides HARQ priority based mechanism to account for the traffic types in future wireless systems.

Referring now to figures, and more particularly to FIGS. 1 through 6, where similar reference characters denote corresponding features consistently throughout the figures.

FIGS. 1A-1B illustrates an example of TDM numerology multiplexing in LTE-FDD system.

In LTE only one numerology is used for all Primary Cell (Pcell) and Secondary Cells (Scells). All the configuration parameters i.e., HARQ, UCI etc., for all the Scells is carried on only the Pcell (as they all operate on the same timeline of frame structure etc.).

Referring to FIG. 1A, where the Pcell and the Scells operating at 15 kHz carrier frequency, the UE receives DL transmissions in sub-frame "n" and feeds back a signaling message indicating of whether the DL transmission received at sub-frame "n" needs to be retransmitted i.e., feeds back Acknowledgement/Negative Acknowledgement (ACK/NACK) information in UL sub-frame at n+4 to both Pcell and the Scells. Thus, when carriers are aggregated, ACK/NACK information corresponding to a plurality of DL carriers in sub-frame n+4 will be fed back in UL sub-frame n concurrently.

Further, in response to transmitting the feedback signalling message, the UE can be configured to receive the DL potential re-transmission of the data in sub-frame "n+8".

The similar HARQ procedure is performed by the UE when the Pcell and the Scells are operating at 30 kHz.

But in case of future wireless systems (e.g., NR i.e., 5G communications systems) different numerologies can be used on different carriers/cells that can be activated (for e.g., the Pcell operating on 15 KHz and the Scells at operating at 30 kHz). Due to the use of carrier aggregation (CA), potentially with different numerologies where HARQ-ACK for carriers using a shorter TTI need to occur on a carrier/cell using a longer TTI, the use of dynamic HARQ-ACK timing, and the potential use of code block based or code block group based HARQ-ACK, is expected. A semi-static HARQ-ACK codebook determination will often lead to a significant increase in resource overhead for achieving a target BLER.

Different carriers can use different numerologies such as different sub-carrier spacing or different duration for a transmission which can be optimal for that particular frequency depending on capability of the UE and the BS. The capability can be, for example, coverage and link robustness for higher frequency links such as mmWave links can be provided by sending control transmissions on lower frequency links, while large bandwidths in higher frequencies can be used for massive data transmissions.

Thus, similar HARQ process to that of LTE (in case of same numerology i.e., both Pcell and Scells operating at 15 kHz/both Pcell and Scells operating at 30kHz) cannot be optimal in the NR (i.e., 5G communication system) incorporating multiple numerologies (i.e., Pcell operating at 15 kHz and Scells operating at 30 kHz).

Further, in LTE, the HARQ-ACK codebook determination can be dynamic based on DAI or semi-static (e.g. based on number of activated cells) and the UL slot for HARQ-ACK transmission by a UE has a fixed timing relation relative to DL slot(s) of corresponding PDSCH receptions. In future wireless systems, both dynamic and semi-static HARQ-ACK codebook determination can be considered, and HARQ-ACK transmission timing can be dynamic as indicated by DCI formats that schedule corresponding PDSCH. Also, there are various types of HARQ procedures synchronous or asynchronous and adaptive vs non-adaptive. Any synchronous HARQ procedure does not have HARQ process and is tightly coupled with a timeline. Therefore, each transmission must stick to timeline and hence cannot share its timeline with anyone else. For example, uplink is mostly using synchronous HARQ procedures. On the other hand when asynchronous HARQ procedures can be used, they use a HARQ process id, HARQ codebook for following appropriate retransmission cycle.

As shown in the FIG. 1A, the numerology-1 (i.e., 15 KHz) has twice the TTI duration to that of the numerology-2 shown in the FIG. 1B. As the symbol duration is inversely proportional to sub-carrier spacing for e.g., if the symbol duration for 15 kHz carrier is 67 $\mu s$ then for 30 kHz carrier the symbol duration would be 33 $\mu s$. Hence, if these numerologies have to share the HARQ procedures, then the numerology-2 will have to wait and thereby the latency increases. For e.g., location of actual A/N for is supposed to be sub-frame "n7=n3+4" (in case of shared HARQ 15 kHz and 30 kHz) but the joint A/N is transmitted at sub-frame "n10=n6+4". Hence, experiencing the latency while performing the shared HARQ procedure.

Unlike to conventional method and systems, the proposed method can be used to manage the HARQ procedure in case of multiple numerologies. Further, the proposed method can be used to perform an efficient and fast joint HARQ procedure based on the HARQ configurations indicated to UE, thereby reducing the latency.

Unlike to conventional method and systems, the proposed method can be used to share the HARQ ID/codebook with other transmissions. Thus, the proposed method can be used to provide a joint HARQ codebook design across carriers with multiple numerologies such that numerology aggregation is taken into account.

FIGS. 2A-2B illustrates an example of TDM numerology multiplexing in LTE-TDD systems with DL-UL configuration 0.

In an example, a frame of ten milliseconds duration is divided into ten sub-frames. A sub-frame can be uplink (UL), downlink (DL) or special sub-frame. The UL and DL sub-frame ratio and number of special sub-frames per frame varies according to the UL-DL configuration used. The available TD LTE UL-DL configurations are illustrated in the FIGS. 2A-2B, where "D" denotes sub-frame reserved for DL transmissions, "U" denotes sub-frame reserved for UL transmissions and "S" denotes a special sub-frame. The special sub-frame is used for switching between DL and UL sub-frames.

Similar problem, as described above in case of LTE-FDD systems persists in the LTE-TDD systems with DL/UL configuration 0 (as shown in FIGS. 2A-2B). The latency needs to be accounted, if the sharing of the HARQ has to be performed.

Unlike to conventional methods and conventional systems, the proposed method can be used to perform the shared HARQ procedure (i.e., in case if the latency is not an issue and the numerology multiplexing is allowed). Otherwise, individual HARQ procedure are preferred. For case of power savings, shared HARQ procedure can be used. Considering all the involved tradeoffs, either shared or individual HARQ processes may be used.

Unlike to conventional method and systems, the proposed method can be used to provide a single HARQ process per numerology configuration in case of numerology multiplexing in single carrier.

Unlike to conventional method and systems, the proposed method be used to effective manage the HARQ processes, as the HARQ processes is limited for each UE.

FIG. 3 illustrates a wireless communication system 300 including a BS 100 and a UE 200 for managing HARQ procedure in case of multiple numerologies, according to embodiment as disclosed herein.

Referring to FIG. 3, the wireless communication system 300 includes the BS 100 communicating with the UE 200. In an embodiment, the wireless communication system 300 may include, for example, an evolved universal terrestrial radio access network (EUTRAN), wireless metropolitan area networks (WMAN), a wireless local area network (WLAN), wireless personal area network (WPAN). The wireless communication system 300 can support various wireless technologies such as, for e.g., global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

In an embodiment, the BS 100 can include, for example, base transceiver station (BTS), evolved Node B (eNB), a generation Node B (gNB), a macrocell, microcell, a picocell, a femtocell, etc.

In an embodiment, the UE 200 can include, for example, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a notebook, a smart book, an ultrabook, or any other similar functioning device. The UE 200 can also be, for example, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an embodiment, the UE 200 includes a RF transceiver 220, a HARQ procedure executor 230, a processor 240 and a memory 250.

The RF transceiver 220, coupled with antenna 210, can be configured communicate with various other apparatus over a transmission medium. The various other apparatus includes, for e.g., network, and any other UE (not shown). The network can include, for example, any of the aforementioned BS 100.

The RF transceiver 220 can be configured to transmit a plurality of UE capability parameters to the BS 100. The plurality of UE capability parameters can include, for example, at least one UE minimum HARQ processing time, subcarrier spacing, TTI length, timing advance (TA), maximum TBS, soft buffer limitations, and UE power constraint. The UE capability parameters can be indicated in terms "N1" and "N2" symbols. For example, consider "N1" to be most relevant according to aspect of the present embodiments.

In case of UE 200 for scheduling in consecutive slots, the number of HARQ processes should be determined by a HARQ re-transmission timer (HTT) (not shown). For example, if the HARQ RTT is 8 slots, then the number of HARQ processes for the UE 200 should be at least 8 for contiguous data scheduling. In LTE, each UE category defines soft buffer size and maximum number of data bits that the UE 200 can receive in the TTI. The maximum number of data bits that the UE 200 can receive in the TTI can be derived by maximum TBS and supported number of cell groups (CGs)/cells (i.e., reported by UE 200 as UE capability parameters).

Even for the same maximum number of data bits per TTI, the maximum TBS and the supported number of CGs may not be fixed. The above factors such as the soft buffer size and maximum TBS can affect HARQ RTT. Regarding HARQ RTT, the UE 200 can report its capability to the gNB. Therefore, the number of HARQ processes that the UE 200 supports may be related to how the UE 200 categories are defined in the NR. Further, the number of HARQ processes supported by the UE 200 is indicated by the UE 200 to the BS 100.

In response to transmitting the plurality of UE capability parameters, the HARQ procedure executor 230, coupled to the RF transceiver 210, can be configured to receive a plurality of HARQ configuration parameters from the BS 100. In an embodiment, the HARQ procedure executor 230 can be configured to receive the plurality of HARQ configuration from the BS 100. In an embodiment, the plurality of UE capability parameters includes, for example, at least one of a HARQ timing configurations, a joined HARQ-ACK codebook for performing the shared HARQ process, a group identifier representing a plurality of carriers corresponding to each identical numerology from multiple numerologies for performing the shared HARQ process, a service type and a plurality of service parameters.

In an embodiment, the UE 200 can be configured to receive the plurality of HARQ configuration parameters through a System Information Block (SIB) message, a Radio Resource Control (RRC) message and a Downlink Control Indicator (DCI) message.

Another interesting problem is whether or not HARQ retransmissions can be performed across numerologies i.e., when the first transmission is on numerology 1 but the corresponding re-transmission is on numerology 2. Note that if the mother code for the different transmissions is different then HARQ is not possible across different numerologies since combining of the data must be performed by the receiver. However, when the mother code is the same, re-transmissions can be performed in a different numerology compared to first transmission if found necessary. When multiple HARQ Ack bits per TB is supported for the future wireless systems, in which case a CB alone may be re-transmitted. When the carrier and bandwidth used for transmission and re-transmission are the same, the benefits of using a different numerology only to address the channel effects may not be much. However if there is a possibility that the bandwidth used for re-transmission may be adapted, specifically in this case increased when compared to the first transmission, then retransmission on a different numerology can help to fasten the procedures. The HARQ entity is something maintained at the MAC layer. If the HARQ retransmission is not performed across different numerologies, it can be modeled that at least one HARQ entity is linked per numerology per carrier. So numerology specific HARQ can be configured, in other words, the BS 100 may indicate no HARQ retransmission is allowed across various numerologies. However, HARQ entity can be shared across numerologies when re-transmissions are allowed across different numerologies. The HARQ configurations can be asymmetric between the base station and UE side depending on the numerologies used at each end and their respective abilities. In such cases, polling based HARQ procedures wherein each node requests the other node at a specific time duration to send the HARQ for all previous time durations can be used.

HARQ Timing: In an embodiment, for dynamic HARQ timing, a fully dynamic signaling can be used via DCI. Another mechanism is to make it RRC and DCI controlled where RRC configures a set of potential timing offsets within which the UE 200 will be prepared ahead of time and DCI can specifically configure one of these offsets. This can provide more controlled asynchronous HARQ procedure for future wireless systems. For instance the RRC configured offsets for HARQ procedures can consider the timelines of the various numerologies involved and think about potential re-transmission durations as shown in the FIGS. 1, 2 and 3 as described above. Then DCI can exactly indicate the re-transmission time based on latency, priority etc. Another mechanism wherein a default HARQ timeline can be configured by the BS 100 as part of the System Information Block (SIB) messages. Therefore, (i) SIB, (ii) RRC and (iii) DCI based mechanisms can be considered for configuring the HARQ timelines and configurations. Switching between these configurations is possible. The SIB-based configuration can be changed every si-modification period instances. Hence, (i) static, (ii) semi-static and (iii) dynamic mechanisms for HARQ timing are considered for future wireless technologies.

Also, since symbol length and TTI depends on subcarrier spacing i.e. numerology, minimum HARQ processing time would be dependent on numerology. When the UE 200 decides its capability of minimum HARQ processing time, the UE 200 should consider subcarrier spacing, TTI length, timing advance (TA), and maximum TBS and indicate to the BS 200 at prior. When self-contained slot structures are being considered for future wireless systems, in extreme latency cases, HARQ may be sent within the same slot.

Considering such a design for future wireless systems, the total number of HARQ processes need not be limited as in LTE. Specifically, several HARQ processes are required to run in parallel so that the transmission of TBs continues while the receiver is decoding already received TBs. For future wireless systems, it can be configurable based on UE ability, number of numerologies supported, service type (eMBB may support large number of HARQ processes while URLLC needs smaller number of HARQ processes to avoid much latency) etc. In fact the total number of HARQ processes that are used depend on total number of cells/numerologies/TTI durations the UE 200 can support as well as processing time for each numerologies/TTI durations. But this is also tied up with the soft buffer size limitations at each node. Since the amount of data to be stored for large number of HARQ processes linearly scales the soft buffer size and memory, a tradeoff exists. It is better to define a small soft buffer size with large number of HARQ processes.

When the number of HARQ processes is very large, and HARQ bundling is used, the coding gains can be better since the size of the payloads are larger. In such cases the latency increases. Hence, a choice can be made as to how many HARQ bits can be bundled based on the coding mechanism such as TBCC/Reed Muller or polar codes used for encoding the PUCCH/PDCCH data where this is sent. This is because each of these codes behaves better at a different number of bits in the payload. Hence, a joint design is necessary for the same.

NACK-based HARQ procedures: Usually in LTE, Ack is sent for every well received packet. In good channel conditions, a lot of Acks will have to be sent. IN such cases, the base station and UE can decide to switch to a NACK-based protocol where a NACK is sent only for un-successful packet (both UL and DL) and thereby save the resources. This switching can be dynamic manner when the mobile conditions are fast varying. In cases where UE is not moving, then semi-static RRC-based reconfiguration can also be used.

In an embodiment, the HARQ procedure executor 230 can include, for example, a HARQ configuration parameter analyzer 232, a HARQ procedure determination engine 234, and a HARQ priority analyzer 236.

In an embodiment, the HARQ configuration parameter analyzer 232 can be configured to analyze the plurality of HARQ configuration parameters received from the BS 100. For e.g., the HARQ configuration parameter analyzer 232 can analyze (example, decode) signaling messages including the HARQ configuration parameters to identify HARQ timeline to be followed by the UE 200.

This is to say that in all these cases, the reference timing can be the Pcell/Scell depending on the implementation and the BS 100 network loading. The timeline can be maintained either based on the Pcell/Scell or any other cell. As long as the Scell follows reference numerology and then that reference timeline can be maintained. This can also be indicated based on the maximum number of cells for the UE 200 to identify which timeline must be used in case sharing of the HARQ process is to be allowed. For example if only 2 cells are used then the Pcell and Scell, then "1" bit can be used as "0" or "1" to indicate the UE 200 to follow the Pcell numerology/Scell numerology. The BS 100 can configure the UE 200 based on the new timeline.

In an embodiment, the HARQ procedure determination engine 234 can be configured to determine whether to perform the individual HARQ procedure or the HARQ sharing procedure based on the output indicated by the HARQ configuration parameter analyzer 232. For e.g., if the HARQ configuration parameter analyzer 232 determines that the there is no HARQ process and soft buffer limit, then HARQ procedure determination engine 234 can be configured to perform the individual HARQ procedure else the shared HARQ procedure is performed.

In an embodiment, for the shared HARQ procedure the HARQ codebook is jointly designed.

In LTE there is a concept of cell group for which all uplink control information is sent jointly. Similarly for the future wireless systems since varied numerologies can be used across varied numbers of carriers, cell groups are identified based on the numerologies used on various carriers and inside each of these cell groups one carrier will be designated as the Pcell group carrier which will carry UCI for all the cells/carriers in this group on same numerology. However, when this is not feasible and the network mandates the UE 200 to send only on one designated Pcell, then the UCI scheduling should account for the various numerologies, latencies involved etc. of all TTI durations corresponding to all numerologies.

Thus, the proposed method can be used to support one PUCCH in one cell group for NR DC/CA. Further, the proposed method allows the wireless communication system 100 to support at least the configuration of one carrier transmitting the PUCCH within the cell group.

In an embodiment, when the UE 200 is configured with carrier aggregation for cells with different numerologies/slot durations, such as a first slot duration and a second slot duration, and with HARQ-ACK transmission on the PUCCH of a cell using the first slot duration (say Pcell), HARQ-ACK timing for HARQ-ACK transmission on a cell using the second slot duration can be with respect to the first slot duration. Regardless of FDD or TDD operation, the first slot duration is P times longer than the second slot duration, then the HARQ-ACK codebook determination the first slot duration corresponds to a bundling window with size of P slots for cells using the second slot duration. Note that this operation can resemble the one in LTE for FDD-TDD CA or TDD CA with different UL-DL configurations. For the operation of a DAI field, cells using different slot durations can be divided into respective groups according to the slot duration. A value of a DAI field in a DL DCI format is set with respect to cells with same slot duration.

Further, the HARQ priority analyzer 236 can be configured to provide HARQ priority based mechanism to account for the traffic types in the future wireless systems (5G).

In order to support proper operations of the URLLC and to account for its low latency aspects, a separate HARQ processes is preferred. Although asynchronous HARQ is used for the future wireless systems may be used, some form of HARQ priority may be needed in such cases to ensure low latency services are not impacted. Although in LTE there was no HARQ process prioritization defined to deal with potential soft buffer overflow, there is a need to define such priorities in future wireless systems according to traffic type and configuration by the network is a reasonable approach. If services are of equal priority, then the BS 100 can in a round-robin fashion cycle the priorities for fairness considerations.

For example, the HARQ priority analyzer 236 can be configured to assign HARQ priority based on the indications (by determining the plurality of the service parameters) received from the BS 110, following are the example of the plurality of the service parameters: a) SR/B SR-based, b) buffer overflow statuses, c) channel conditions (better channel condition can finish its transmission fast and then allow for long re-transmission cycles of bad channel conditions devices), d) beam training periods (which can be indicative of channel quality in mmWave beamforming systems), e) coverage levels identified using RSRP/RSRQ, f) data type (voice/video/public safety etc.,) g) QoS requirements h) the UE capability (low power UE has more priority than high power UE), among others.

Some new bits for HARQ priority may have to be added. The number of bits is received by the UE 200 in the PDCCH from the BS 100, where each bit indicates the timing of HARQ transmission. The number of bits depends on number of numerologies that the UE 200 can support simultaneously or number of CGs defined for the future wireless systems. This can define the PDCCH format that the UE 200 will have to receive. For example, a different PDCCH format can be used to indicate this number of bits depending on the size of the bits used for HARQ priority indication.

The processor 240 can be configured to execute the instructions received from the other hardware components of the UE 200.

The memory 250 can be, for e.g., a computer-readable medium such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Figure 4:
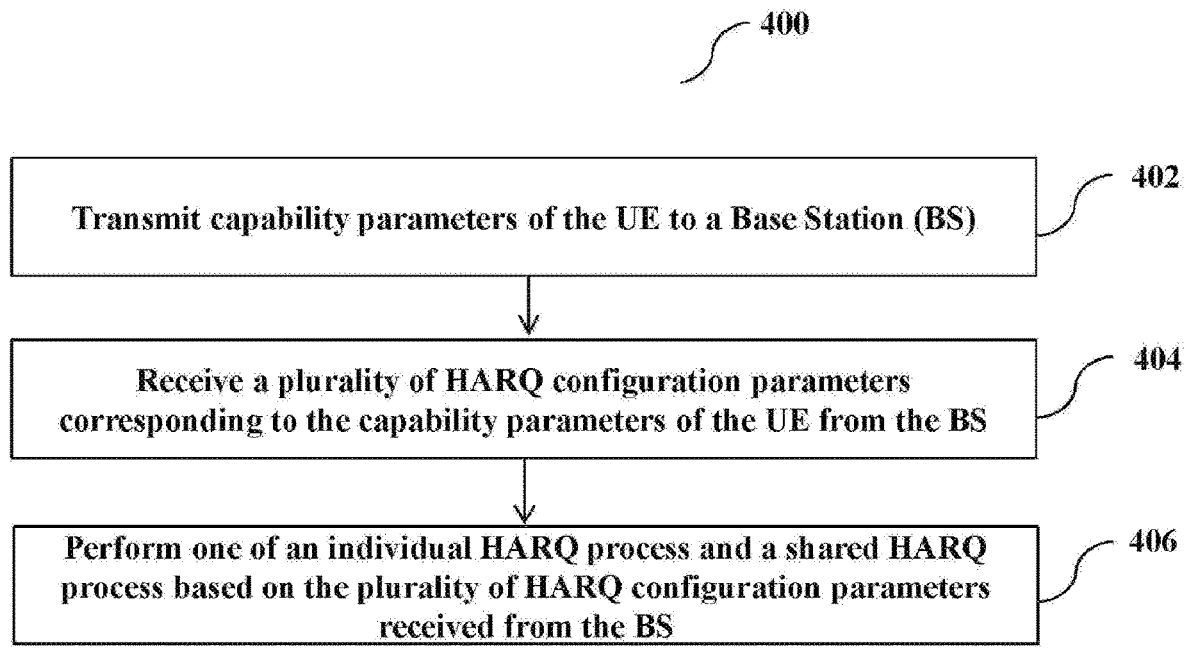
FIG. 4 is a flow diagram illustrating a method for managing hybrid automatic repeat request (HARQ) procedure for multiple numerologies multiplexing, according to embodiment as disclosed herein.

FIG. 4 is a flow diagram illustrating a method 400 for managing HARQ procedure for multiple numerologies multiplexing, according to embodiment as disclosed herein.

At step 402, the method includes transmitting the capability parameters of the UE 200 to the BS 100. In an embodiment, the method allows the RF transceiver 210 to transmit the capability parameters of the UE 200 to the BS 100.

At step 404, the method includes receiving the plurality of HARQ configuration parameters corresponding to the capability parameters of the UE 200 from the BS 100. In an embodiment, the method allows the HARQ procedure executor 230 to receive the plurality of HARQ configuration parameters corresponding to the capability parameters of the UE 200 from the BS 100.

At step 406, the method includes performing one of the individual HARQ process and the shared HARQ process based on the plurality of HARQ configuration parameters received from the BS 100. In an embodiment, the method allows the HARQ procedure determination engine 234 to perform one of the individual HARQ process and the shared HARQ process based on the plurality of HARQ configuration parameters received from the BS 100.

Figure 5:
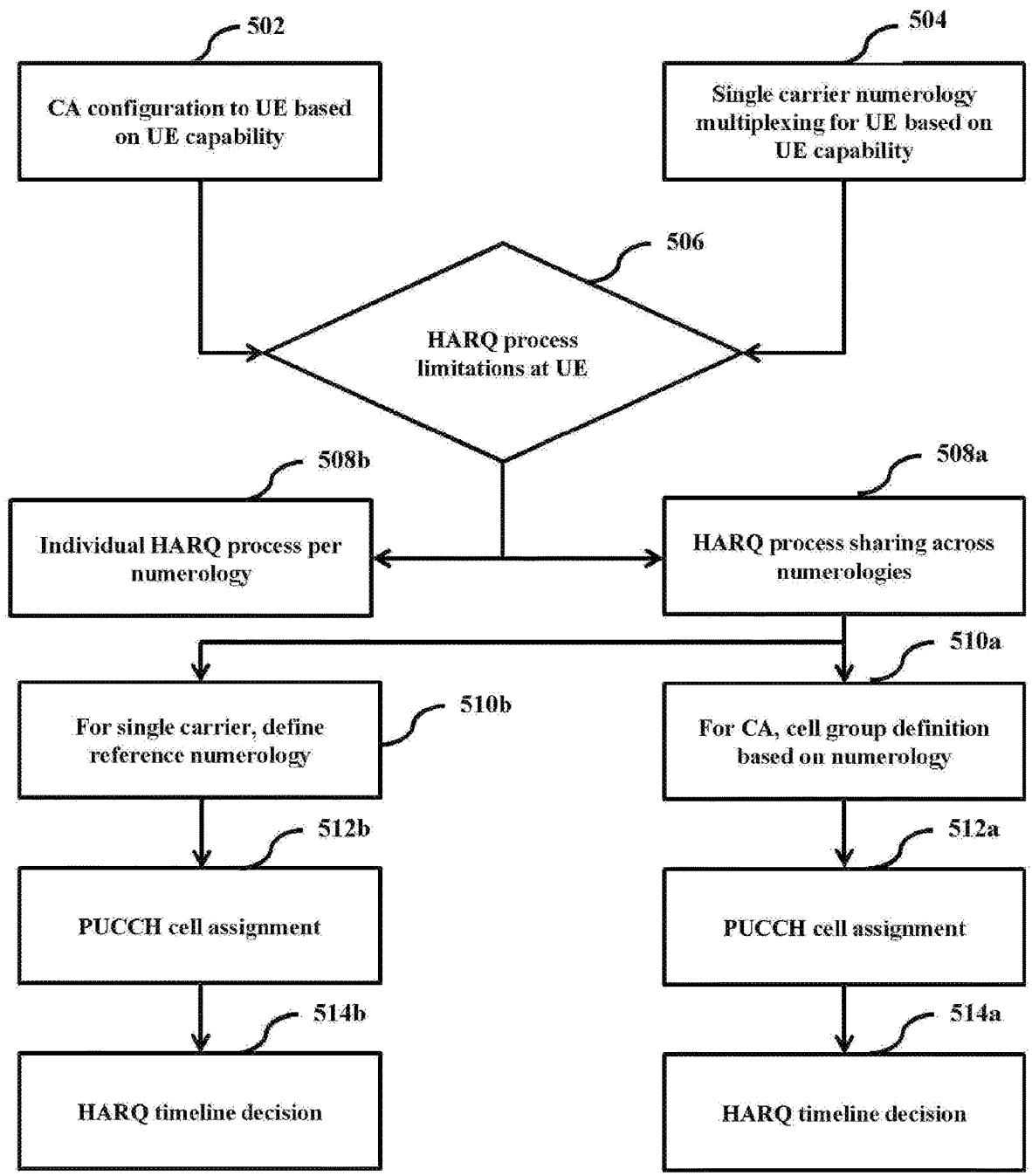
FIG. 5 is a flow diagram illustrating various steps performed by the BS (i.e., gNB) for indicating a plurality of HARQ configuration parameters to the UE corresponding to the capability parameters of the UE, according to an embodiment as disclosed herein.

FIG. 5 is a flow diagram 500 illustrating various steps performed by the BS (i.e., gNB) for indicating a plurality of HARQ configuration parameters to the UE corresponding to the capability parameters of the UE, according to an embodiment as disclosed herein. At step 502, the method includes determining carrier aggregation (CA) configuration based on UE capability. At step 504, the method includes determining single carrier numerology multiplexing for UE based on UE capability. At step 506, the method includes determining the HARQ process limitations at the UE 200 are determined based on the UE capability information, then the BS 100 indicates the UE to perform individual HARQ procedure or shared HARQ procedure based on the capability parameters of the UE 200.

At step 508*a* and 508*b*, the BS 100 determines and indicates whether to perform individual HARQ procedure or shared HARQ procedure through HARQ configuration parameters. At step 510*a*, the BS provides cell group definition for the CA based on numerology, in which the BS 200 assigns a group identifier representing a plurality of carriers corresponding to each identical numerology from multiple numerologies for performing the shared HARQ procedure. At step 512*a*, a PUCCH per group of carriers with same numerology is assigned and accordingly HARQ timeline decision is indicated to the UE 200 at step 514*a*.

In case of single carrier numerology, the BS 100 defines reference numerology at step 510*b*. Further, at step 512*b*, the BS 100 assigns PUCCH numerology and accordingly HARQ timeline decision is indicated to the UE 200 at step 514*b*.

Figure 6:
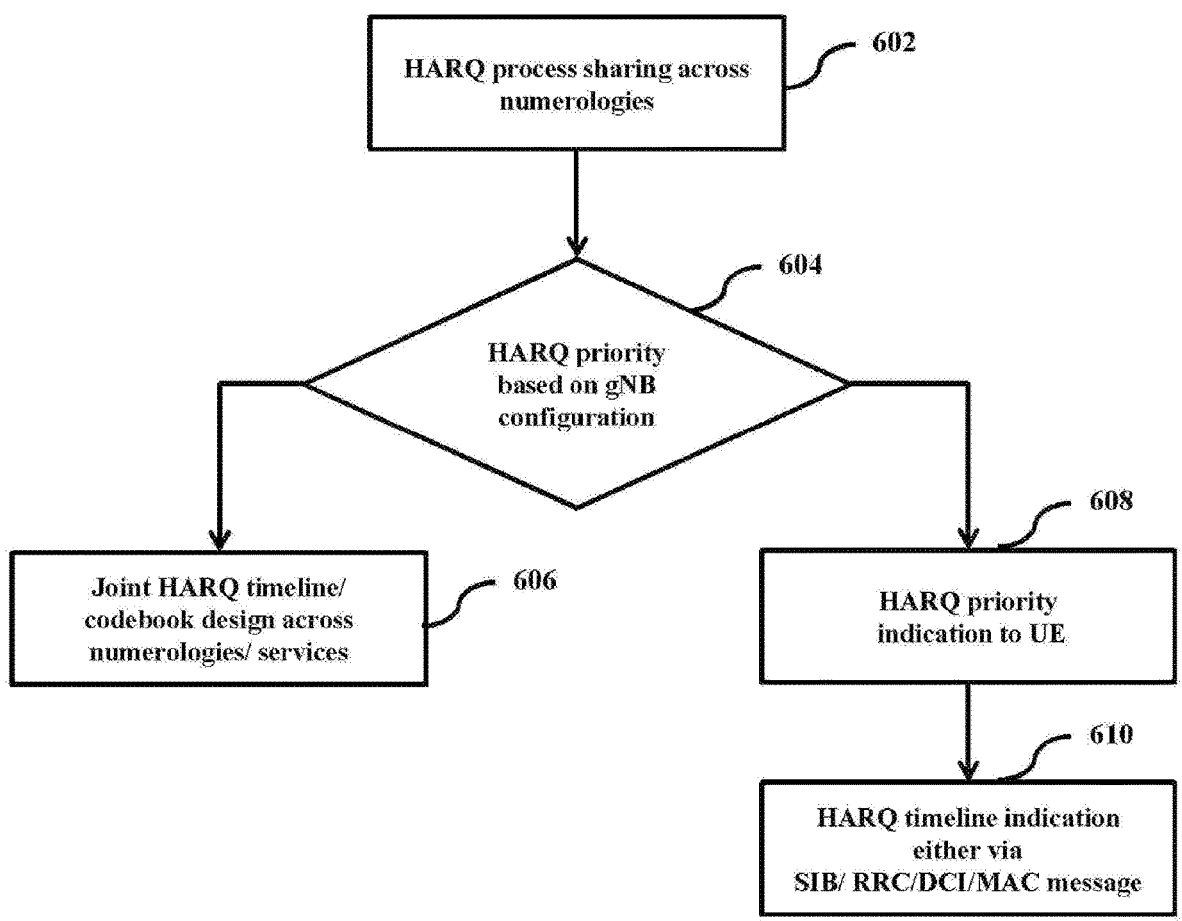
FIG. 6 is a flow diagram illustrating various steps performed by the BS (i.e., gNB) for indicating HARQ priority handling to the UE, according to an embodiment as disclosed herein.

FIG. 6 is a flow diagram 600 illustrating various steps performed by the BS (i.e., gNB) for indicating HARQ priority handling to the UE, according to an embodiment as disclosed herein.

At step 602, the BS 100 determines the shared HARQ procedure based on capability parameters of the UE 200. At step 604, the BS 100 determines whether to provide HARQ priority based on configuration of BS 100. In case, the BS 100 determines that there is no HARQ priority to be provided to the UE 200, then at step 606, the BS 100 provides Joint HARQ timeline/codebook design across numerologies/services. In case, the BS 100 determines to provide HARQ priority to the UE 200, at step 608, the BS 100 indicates HARQ priority to the UE. At step 610, the HARQ timing configurations are indicated to the UE 200 through one of the SIB message, a RRC message and a Downlink Control Indicator (DCI) message and a MAC message.

The embodiments disclosed herein can be implemented through at least one software program running on at least one hardware device and performing network management functions to control the elements. The elements shown in the FIGS. 1 through 6 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a base station (BS) for managing hybrid automatic repeat request (HARQ) procedure, the method comprising:
   transmitting, to a user equipment (UE), information for indicating a joint feedback or a separate feedback;
   in case that the information indicates the separate feedback, receiving a HARQ-acknowledgement (ACK) transmission for a first cell and a HARQ-ACK transmission for a second cell, separately; and
   in case that the information indicates the joint feedback, receiving a HARQ-ACK transmission associated with combined information for the first cell and the second cell, on one physical uplink control channel (PUCCH),
   wherein the combined information is multiplexed for multiple physical downlink shared channel, PDSCH, receptions of the first cell and the second cell.

2. The method of claim 1, further comprising:
   transmitting, to the UE, information on one or more timing offsets via a radio resource control, RRC, signaling; and
   transmitting, to the UE, downlink control information, DCI, indicating one of the one or more timing offsets, and
   wherein the one or more timing offsets are used to indicate an uplink timing for a HARQ-ACK transmission relative to PDSCH reception scheduled by the DCI.

3. The method of claim 1, wherein one of a dynamic HARQ-ACK codebook or a semi-static HARQ-ACK codebook is used as a HARQ-ACK codebook for each of the first cell and the second cell.

4. The method of claim 1, wherein the first cell is included in a first group for a first group identifier,
   wherein the second cell is included in a second group for a second group identifier, and
   wherein the first group identifier and the second group identifier are obtained based on radio resource control, RRC, signaling.

5. The method of claim 1, wherein the first cell is associated with a first numerology indicating a first slot length, and
   wherein the second cell is associated with a second numerology indicating a second slot length.

6. A user equipment (UE) for managing hybrid automatic repeat request (HARQ) procedure, the UE comprising:
   at least one transceiver; and
   at least one processor
   configured to:
      receive, from a base station (BS), information for indicating a joint feedback or a separate feedback;
      in case that the information indicates the separate feedback, perform a HARQ-acknowledgement (ACK) transmission for a first cell and a HARQ-ACK transmission for a second cell, separately; and
      in case that the information indicates the joint feedback, perform a HARQ-ACK transmission associated with combined information for the first cell and the second cell, on one physical uplink control channel (PUCCH),
   wherein the combined information is generated for physical downlink shared channel (PDSCH) receptions of the first cell and the second cell, and
   wherein the combined information is generated by jointly designing a HARQ-ACK codebook for each of the first cell and the second cell.

7. The UE of claim 6, wherein the
   at least one processor is further configured to:
      receive, from the BS, information on one or more timing offsets via a radio resource control (RRC) signaling; and
      receive, from the BS, downlink control information, DCI, indicating one of the one or more timing offsets, and
   wherein the one or more timing offsets are used to indicate an uplink timing for a HARQ-ACK transmission relative to PDSCH reception scheduled by the DCI.

8. The UE of claim 6, wherein one of a dynamic HARQ-ACK codebook or a semi-static HARQ-ACK codebook is used for the HARQ-ACK codebook for each of the first cell and the second cell.

9. The UE of claim 6, wherein the first cell is included in a first group for a first group identifier,
   wherein the second cell is included in a second group for a second group identifier, and
   wherein the first group identifier and the second group identifier are obtained based on a radio resource control (RRC) signaling.

10. The UE of claim 9, wherein the first cell is associated with a first numerology indicating a first slot length, and
    wherein the second cell is associated with a second numerology indicating a second slot length.

11. A method performed by a user equipment (UE) for managing hybrid automatic repeat request (HARQ) procedure, the method comprising:
    receiving, from a base station, information for indicating a joint feedback or a separate feedback;
    in case that the information indicates the separate feedback, performing a HARQ-acknowledgement (ACK) transmission for a first cell and a HARQ-ACK transmission for a second cell, separately; and
    in case that the information indicates the joint feedback, performing a HARQ-ACK transmission associated with combined information for the first cell and the second cell, on one physical uplink control channel (PUCCH),
wherein the combined information is generated for physical downlink shared channel (PDSCH) receptions of the first cell and the second cell, and
wherein the combined information is generated by jointly designing a HARQ-ACK codebook for each of the first cell and the second cell.

12. The method of claim 11, further comprising:
receiving, from the base station, information on one or more timing offsets via a radio resource control (RRC) signaling; and
receiving, from the base station, downlink control information, DCI, indicating one of the one or more timing offsets, and
wherein the one or more timing offsets are used to indicate an uplink timing for a HARQ-ACK transmission relative to PDSCH reception scheduled by the DCI.

13. The method of claim 11, wherein one of a dynamic HARQ-ACK codebook or a semi-static HARQ-ACK codebook is used for the HARQ-ACK codebook for each of the first cell and the second cell.

14. The method of claim 11,
wherein the first cell is included in a first group for a first group identifier,
wherein the second cell is included in a second group for a second group identifier, and
wherein the first group identifier and the second group identifier are obtained based on a radio resource control (RRC) signaling.

15. The method of claim 14,
wherein the first cell is associated with a first numerology indicating a first slot length, and
wherein the second cell is associated with a second numerology indicating a second slot length.

16. A base station, for managing hybrid automatic repeat request, HARQ, procedure, comprising:
at least one transceiver; and
at least one processor configured to:
transmit, to a user equipment, UE, information for indicating a joint feedback or a separate feedback;
in case that the information indicates the separate feedback, receive a HARQ-acknowledge, ACK, transmission for a first cell and a HARQ-ACK transmission for a second cell, separately; and
in case that the information indicates the joint feedback, receive a HARQ-ACK transmission associated with combined information for the first cell and the second cell, on one physical uplink control channel, PUCCH,
wherein the combined information is multiplexed for multiple physical downlink shared channel, PDSCH, receptions of the first cell and the second cell.

17. The base station of claim 16, wherein the at least one processor is further configured to:
transmit, to the UE, information on one or more timing offsets via a radio resource control, RRC, signaling; and
transmit, to the UE, downlink control information, DCI, indicating one of the one or more timing offsets, and
wherein the one or more timing offsets are used to indicate an uplink timing for a HARQ-ACK transmission relative to PDSCH reception scheduled by the DCI.

18. The base station of claim 16, wherein one of a dynamic HARQ-ACK codebook or a semi-static HARQ-ACK codebook is used for the HARQ-ACK codebook for each of the first cell and the second cell.

19. The base station of claim 16,
wherein the first cell is included in a first group for a first group identifier,
wherein the second cell is included in a second group for a second group identifier, and
wherein the first group identifier and the second group identifier are obtained based on radio resource control, RRC, signaling.

20. The base station of claim 16,
wherein the first cell is associated with a first numerology indicating a first slot length, and
wherein the second cell is associated with a second numerology indicating a second slot length.

* * * * *